United States Patent [19]
Rinas

[11] Patent Number: 5,116,166
[45] Date of Patent: May 26, 1992

[54] 45 DEGREE MITER UNDERCUTTER BIT

[76] Inventor: Glenn Rinas, 9115 - 105 Avenue, Fort St. John, B. C., Canada, V1J 2L5

[21] Appl. No.: 609,728

[22] Filed: Nov. 6, 1990

[51] Int. Cl.⁵ .............................................. B23C 3/12
[52] U.S. Cl. ...................... 407/57; 144/220; 144/240; 409/180
[58] Field of Search .................. 409/180, 138, 181; 144/220, 240; 407/30, 32, 56, 57

[56] References Cited

U.S. PATENT DOCUMENTS

| | | | |
|---|---|---|---|
| 1,459,534 | 6/1923 | Hilker | 144/253 D |
| 3,196,749 | 7/1965 | Zanni | 409/180 |
| 3,289,717 | 12/1966 | Dutot | 407/56 |
| 3,839,942 | 10/1974 | Ferchland | 407/57 |
| 4,252,481 | 2/1981 | Krieg | 407/57 |
| 4,844,135 | 7/1989 | Witt | 144/240 |
| 5,004,385 | 4/1991 | Kishi | 409/180 |
| 5,018,914 | 5/1991 | Kishi | 409/180 |

*Primary Examiner*—Daniel W. Howell
*Attorney, Agent, or Firm*—Dressler, Goldsmith, Shore, Sutker & Milnamow, Ltd.

[57] ABSTRACT

A miter undercutter bit is provided which is functional to make a 45 degree angled miter. The assembly includes a rotatable shaft having a cutter mounted thereon. The cutter comprises a pair of 45 degree angle arms which upon rotation thereof make the miter. A bearing having a diameter substantially equal to that of the base of the cutter is utilized.

1 Claim, 1 Drawing Sheet

45 DEGREE MITER UNDERCUTTER BIT

FIELD OF THE INVENTION

The present invention relates to a router miter bit.

BACKGROUND OF THE INVENTION

In building with veneered, laminated, panelling or the like products it is often required to make a miter joint of 90 degrees at corners. Until the present time, this carpentry was usually carried out the with use of saws. However, this method is not only laborious, but is is difficult to arrive at a perfect joint. Before the present invention therefore, there existed the need for a device functional to make miter joints quickly and with accuracy.

SUMMARY OF THE INVENTION

In accordance with the present invention, there is provided a miter joint undercutter bit which is functional to make a miter joint of 90 degrees in veneer, panelling, laminates and the like.

More specifically, the assembly relies on the provision of a triangularly winged cutter having an oversized bearing therebeneath. The diameter of the cutter base and said bearing are substantially equal. As a result, upon rotation of said cutter by a router, a 45 degree angled cut is made.

Broadly stated, the invention comprises, a miter joint undercutter bit assembly adapted for use with a router which comprises:

a rotatable shaft adapted for attachment to said router;

a cutter mounted on said shaft and adapted to rotate therewith, said cutter forming a generally triangular arm defining an upper surface which extends downwardly from said shaft at an angle of about 45 degrees;

bearing means mounted on said shaft beneath said cutter, said bearing means having substantially the same diameter as the base of said cutter; and means for securing said bearing means and said cutter to said assembly.

DESCRIPTION OF THE PREFERRED EMBODIMENT

Figure 1:
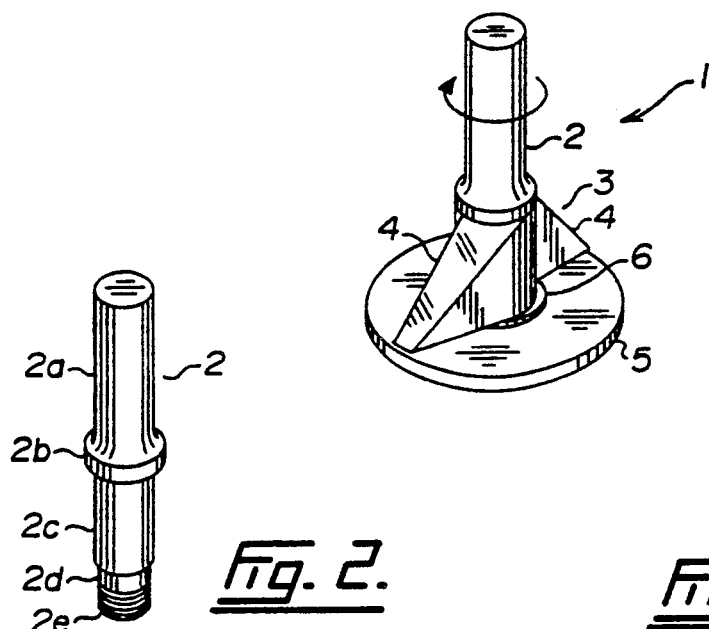
FIG. 1 is a perspective view of the miter joint undercutter bit of the present invention
Figure 2:
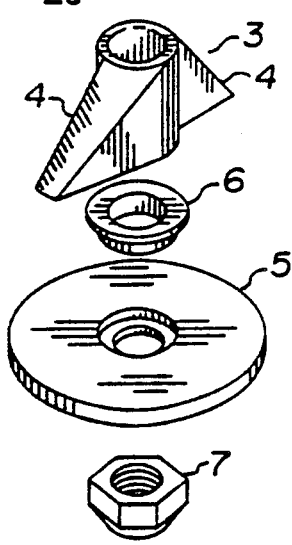
FIG. 2 is an exploded view of the bit of FIG. 1
Figure 3:
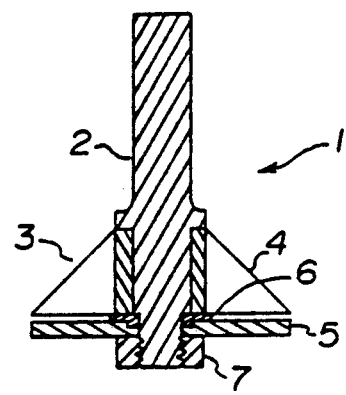
FIG. 3 is a side-sectional view of the bit of FIG. 1.

Having reference to the accompanying drawings, there is provided a miter joint undercutter bit 1. More specifically, the bit 1 comprises a rotatable flanged shaft 2 adapted for connection with a router (not shown herein). The cutter 3 is rotatably mounted on said shaft and adapted for rotation therewith. A pair of generally triangular arms 4 extend outwardly from said cutter 3. The cutter arms 4 define an upper surface which is angled downwardly at 45 degrees. It is to be understood that said cutter 3 may have more than 1 pair of arms. A circular bearing 5 having a diameter substantially equal to that of the base of the cutter 3 is positioned therebeneath. A washer 6 is placed between the cutter 3 and the bearing 5. A nut 7 is provided at the base of the bearing 5 to secure it in place.

The embodiments of the invention in which an exclusive property or privilege is claimed are defined as follows:

1. A miter joint undercutter bit assembly adapted for use with a router which comprises:

a rotatable shaft adapted for attachment to said router;

a cutter mounted on said shaft and adapted to rotate therewith, said cutter forming a generally triangular arm defining an upper surface which extends downwardly from said shaft at an angle of about 45 degrees;

bearing means mounted on said shaft beneath said cutter, said bearing means having substantially the same diameter as the base of said cutter; and means for securing said bearing means and said cutter to said assembly.

* * * * *